United States Patent Office 3,605,822
Patented Sept. 20, 1971

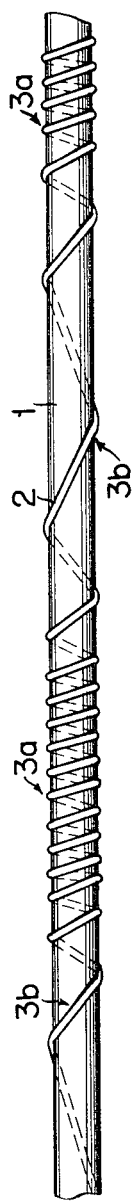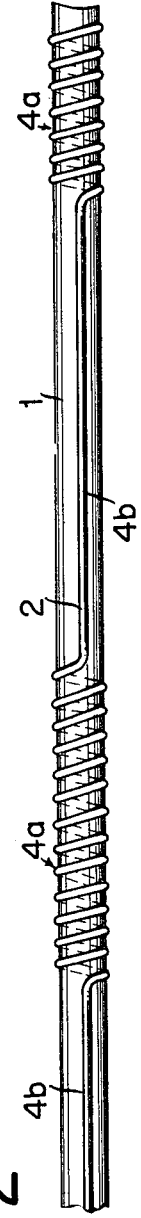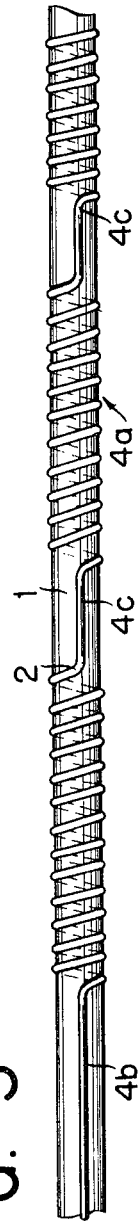

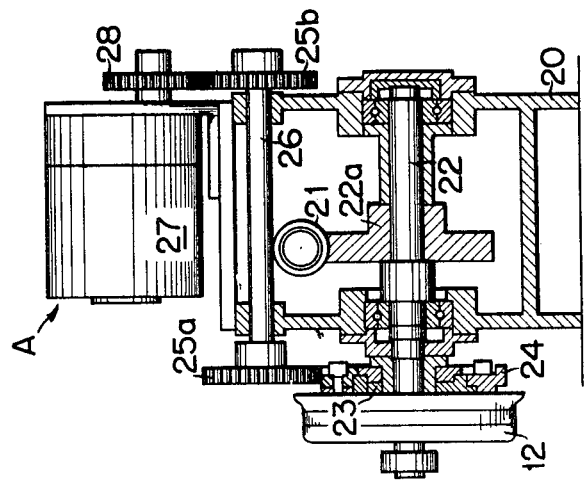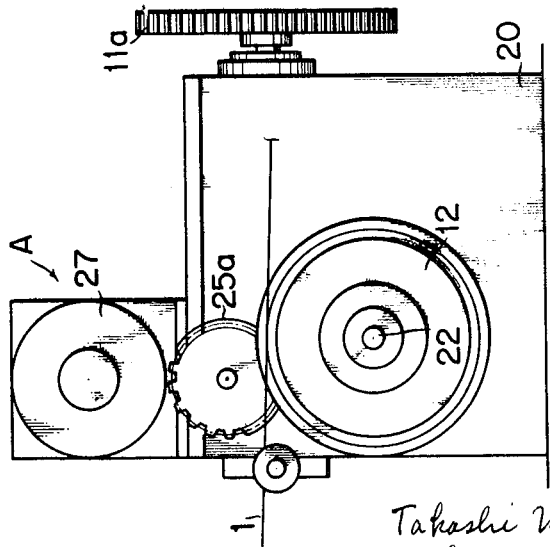

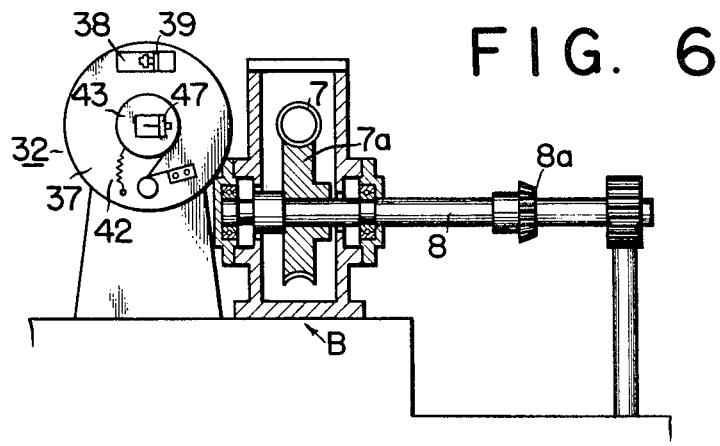
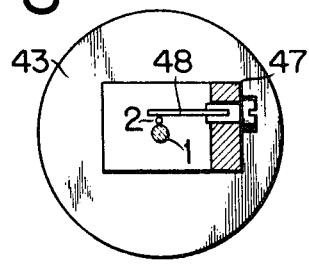
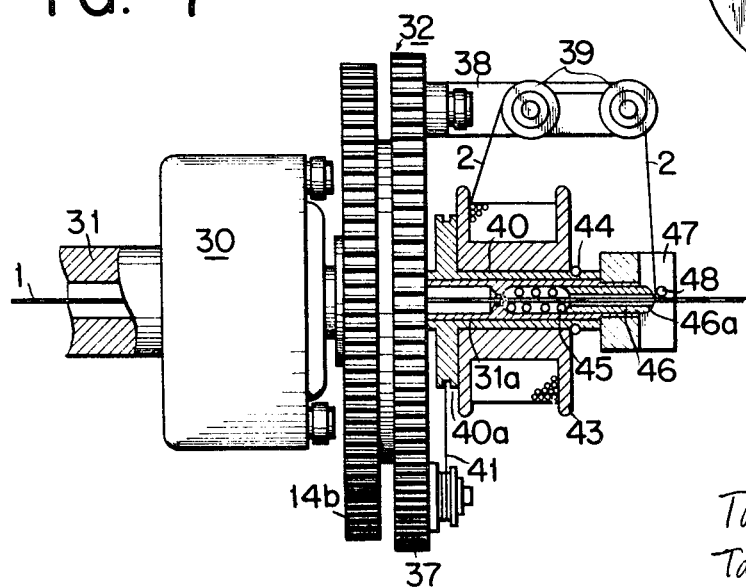

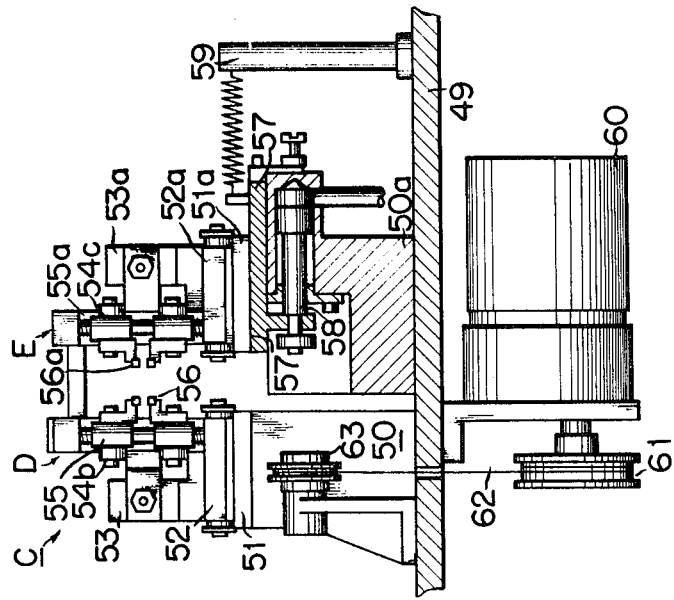
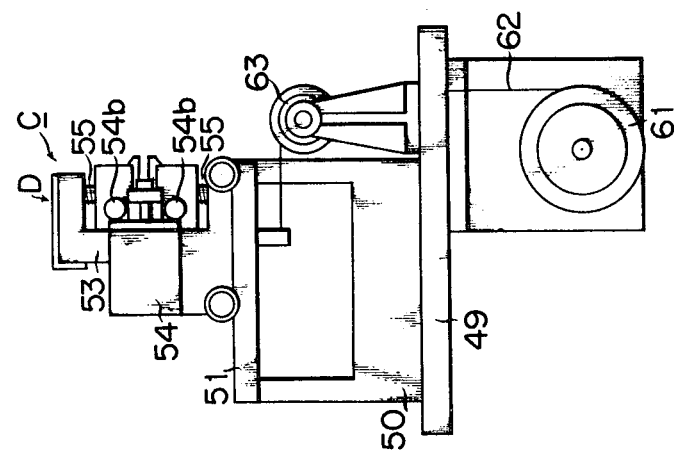

3,605,822
APPARATUS FOR WINDING COILS TO FORM A STRAIGHT LEG PORTION BETWEEN ADJACENT COIL SECTIONS
Takashi Noguchi, Sagamihara-shi, and Takashi Takahashi, Yokohama-shi, Japan, assignors to Tokyo Shibaura Electric Co., Ltd., Kawasaki-shi, Japan
Filed Dec. 4, 1968, Ser. No. 781,168
Int. Cl. B21f 3/04
U.S. Cl. 140—71.5                3 Claims

ABSTRACT OF THE DISCLOSURE

A coiling head is rotated about a continuously advanced mandrel to helically wind a filament wire about the mandrel to form coil sections and while the rotation of the coiling head is being stopped the mandrel and filament wire are clamped by chucks and advanced straightly to form the straight leg portion between adjacent coil sections.

BACKGROUND OF THE INVENTION

This invention relates to a method and apparatus for forming filament coils by winding a filament wire about the outer periphery of a mandrel successively advanced in a definite direction. For the purpose of description the invention will be described hereunder as embodied in a filament coil winding machine to produce filament coils for incandescent lamps but it should be understood that this invention is not limited to this particular machine.

In the filament coil winding machine of the type referred to above, as the mandrel is used a wire of molybdenum or iron of about 0.1 to 1.5 mm. in diameter and as the filament wire a wire of tungsten of about 0.05 to 0.5 mm. in diameter. To form filament coils, the filament wire is wound about the mandrel in such a manner as to form alternate dense and coarse coil sections. Then both mandrel and filament wire are cut at respective coarse coil sections. Then the mandrel is removed by dissolution to provide descrete filament coils each having a coiled portion and legs extending from the opposite ends thereof. An incandescent lamp can be fabricated by connecting said legs to the inner ends of lead wires of a mount. Thus, in order to mount the filament coil at a definite position when assembling the lamp it is advantageous to cause said legs to project linearly and axially from the opposite ends of the filament coil.

Although various methods and machines are used to form such filament coils, it is still impossible to form filament coils having sufficiently straight legs. According to one previous method a coiling head adapted to wind a filament wire about a mandrel is rotated at a uniform high speed, the mandrel is normally advanced at a constant speed to form a coil at a constant pitch but the mandrel is advanced at a higher speed when forming the legs. According to another method, normally the mandrel is advanced at a constant speed and the coiling head is also rotated at a uniform speed but at the time of forming legs, the rotation of the coiling head is stopped while the mandrel is advanced continuously. In any case, however, when the next section of the coil is formed subsequent to the leg forming step the leg portions are deformed thus failing to form straight legs.

In another machine, a separate coiling nose for holding leg portions of the coil is situated close to the coiling head and a cam is provided to advance and retract the coiling nose to form leg portions. With this machine too, since legs are formed during high speed rotation of the coiling head and since the coiling nose can not fixedly secure coil legs to the mandrel, the legs are deformed, again failing to form sufficiently straight legs.

SUMMARY OF THE INVENTION

It is therefore an object of this invention to provide an improved method capable of forming filament coils having straight legs at the opposite ends of respective coils.

Another object of this invention is to provide an apparatus capable of forming filament coils having straight legs at the opposite ends of respective coils.

Briefly stated, according to this invention there is provided a coil winding apparatus comprising a coiling head for winding a filament wire about a mandrel, a drum means to advance the mandrel, and chuck means including chucks reciprocable with respect to the coiling head to hold opposite ends of a coiled portion of a filament coil which is prepared by winding a filament wire about the mandrel.

BRIEF DESCRIPTION OF THE DRAWINGS

This invention can be more fully understood from the following description when taken in conjunction with the accompanying drawings, in which:

FIG. 1 shows a side view of a portion of a filament wire wound about a mandrel according to a prior method and apparatus;

FIGS. 2 and 3 show side views of portions of filament wires wound about a mandrel according to the method and apparatus;

FIG. 5A shows a front elevation of a take-up drum;

FIG. 5B shows a side view, partly in section, of the take-up drum shown in FIG. 5A;

FIG. 6 shows a front elevation, partly in section, of a driving force transmitting mechanism for a coiling device;

FIG. 7 shows a side view of the coiling head with its fore portion cut away;

FIG. 8 shows an enlarged front view of a portion of the coiling head shown in FIG. 7;

FIG. 9A shows a side view of a chuck device;

FIG. 9B shows a front view, partly in section, of the chuck device shown in FIG. 9A;

DETAILED DESCRIPTION OF THE INVENTION

Figure 4:
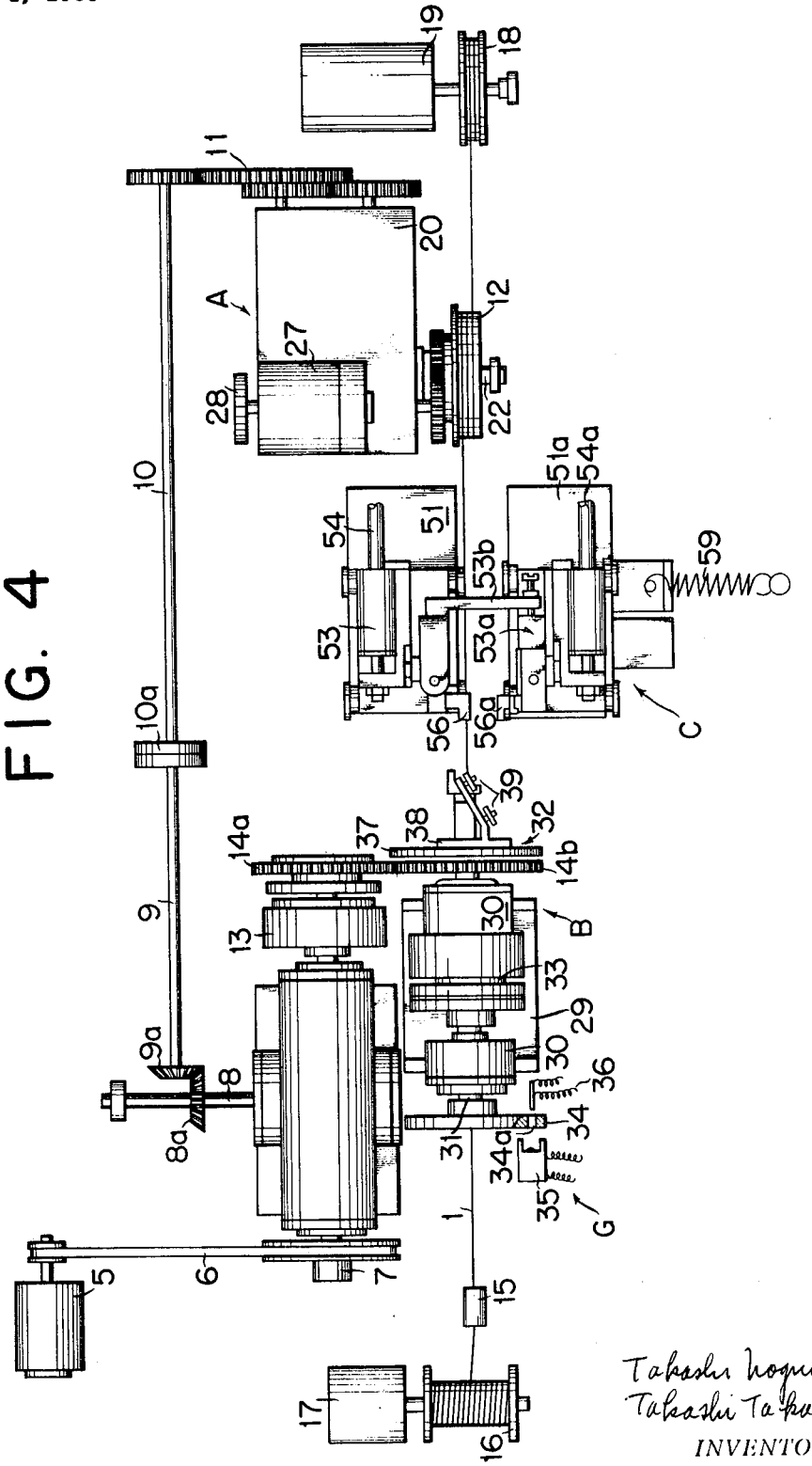
FIG. 4 shows a plan view, partly broken away, of a coil winding machine embodying this invention.

FIG. 1 shows a portion of a filament coil comprising a filament wire 2 wound about a mandrel according to a prior method and apparatus. Filament wire 2 is wound to form densely wound coil sections at a predetermined spacing and helical leg portions 3b between adjacent coil sections 3a. It will be seen that with this method of coiling it is impossible to form filament coils with straight legs.

FIG. 2 shows a portion of the filament coil wound according to the method and apparatus to be described later in more detail, said filament coil comprising densely wound coil sections 4a and straight leg portions 4b between adjacent coil sections 4a. A filament coil shown in FIG. 3 has shorter leg portions 4c than those shown in FIG. 2. The latter filament coil is suitable for use in incandescent lamps wherein the filament coil is mounted in a zig-zag configuration between lead wires, such for example, as lamps for projectors.

Turning now to FIGS. 4 to 6, the construction of the coil winding machine will be outlined. As shown, a main drive source, i.e. an electric motor 5 is provided to drive a worm shaft 7 through a V belt 6. A shaft 8 is driven by a worm wheel 7a gearing with the worm shaft 7 to drive a transmission shaft 9 through bevel gears 8a and 9a, said transmission shaft 9 being perpendicular to shaft 8. An intermediated shaft 10 is coupled to the transmission shaft 9 through an electromagnetic coupling 10a to drive a drum 12 through a gear train 11 and a drum device A. On the opposite end of shaft 7 is connected a gear 14a via an electromagnetic clutch 13 to drive a coiling mechanism B to be described later through a gear 14b gearing with gear 14a. A chuck device C is provided closely adjacent the exit side of the coiling mechanism B. A mandrel 1 is advanced successively through coiling mechanism B, chuck device C and drum device A. On the entry side of the coiling head B is disposed an unwinder 17 having spaced apart guide rollers 15 and a spool 16 for the mandrel, and a slip winding device 19 with a spool 18 is provided on the exit side of the drum 12.

FIGS. 5A and 5B show details of the drum device A. More particularly, a worm shaft 21 is provided across the main body 20 of the drum device A, a driven gear 11a of said gear train 11 being mounted on one end of worm shaft 21. A drum shaft 22 carrying a worm wheel 22a is disposed at right angles with respect to worm shaft 21, said drum 12 being mounted on one end of drum shaft 22 via one-way clutch 23. To the rear surface of drum 12 is integrally mounted a gear 24 to mesh a gear 25a mounted on one end of a shaft 26. A gear 25b mounted on the opposite end of shaft 26 meshes a gear 28 driven by a miniature motor 27 with a reduction gearing. Thus, by the selective operation of clutch 23, drum 12 will be driven either by worm shaft 21 or by miniature motor 27.

As shown in FIG. 4, the coiling mechanism B includes a housing B having spaced apart pedestals, not shown. Bearings 30 are mounted on the upper ends of these pedestals to journal a hollow shaft 31. The gear 14b and a coiling head 32 are integrally mounted on the exit end of the hollow shaft 31 while an electromagnetic brake 33 is mounted on the intermediate portion of hollow shaft 31. On the entry end of the hollow shaft 31 is mounted a circular disc 34 provided with a perforation 34a. A lamp 35 and a phototransistor 36 are provided on the opposite sides of the disc 34 to oppose perforation 34a to constitute a counting mechanism G that counts the number of revolutions of the disc 34.

FIGS. 7 and 8 show the detail of the coiling head 32. As shown, a circular disc 37 is integrally mounted on the exit side of gear 14b and an L-shaped bracket 38 is mounted on the front surface of disc 37 to rotatably support guide rollers 39 at its outer end. A cylindrical bushing 40 having a flange 40a at its end is rotatably fit over a hollow shaft 31 projecting forwardly of the center of the disc 37. A wire 41 is passed around a flange 40a and a spring 42 is connected to the outer end of wire 41 to normally apply a back-pull tension to filament wire 2. A bobbin 43 carrying the filament wire 2 is removably mounted on the bushing 40 by means of a stop ring 44. A coil spring 45 is contained in an opening 31a at the exit end of hollow shaft 31 to urge outwardly a cylindrical nozzle 46 also contained in the hollow shaft. The nozzle 46 is provided with an axial opening 46a through which the mandrel 1 is advanced. An L-shaped bracket 47 is mounted on the periphery of the outer end of the hollow shaft 31 to carry a bridging pin 48 which functions to prevent nozzle 46 from projecting. The filament wire payed out from bobbin 43 is supplied to a point behind bridging pin 48 over guide rollers 39 to be continuously wound about mandrel 1 as the coiling head 32 rotates.

Referring again to FIG. 4, a chuck device C is provided near coiling head 32 to form straight leg portions of respective coils. FIGS. 9A and 9B show details of the construction of the chuck device C. Generally box-shaped guide blocks 50 and 50a are mounted on a base 49 on the opposite sides of the path of travel of mandrel 1. A guide plate 51 is mounted on the upper surface of one guide block 50 to slidably support a chuck support 53 through rollers 52. A chuck D is mounted on the upper surface of chuck support 53. Also on the chuck support 53 is mounted an air cylinder 54 to reciprocate a plate cam 54b which serves to actuate jaws 56 of the chuck. Opposing surfaces of jaws 56 are formed with substantially triangular grooves to hold and clamp filament wire 2 therebetween, the depth of the triangular grooves being increased toward the entry side. Similarly, a slide plate 57 is slidably mounted on the other guide block 50a, said slide plate 57 being moved by an air cylinder 58 disposed beneath it in a direction normal to the part of travel of mandrel 1, i.e. toward guide block 50. The slide plate 57 is restored by a spring 59. Further, on the upper surface of slide plate 57 is mounted a chuck support 53a through rollers 52a to support a chuck E opposing said chuck D. Similar to chuck D, jaws 56a of chuck E are operated by an air cylinder 54a, a plate cam 54c operated thereby and a spring 55a.

As shown in FIGS. 9A and 9B, a miniature motor 60 is mounted on the under side of base 49 to drive chuck support 53 through a rope 62 passing over a pulley 61 mounted on the motor shaft and an intermediate guide roller 63. As shown in FIG. 4, chuck support 53 is connected to chuck support 53a via a connecting arm 53b to urge chuck support 53a in the forward direction. Thus, chucks D and E are restored to their original position by the operation of miniature motor 60.

Figure 10A:
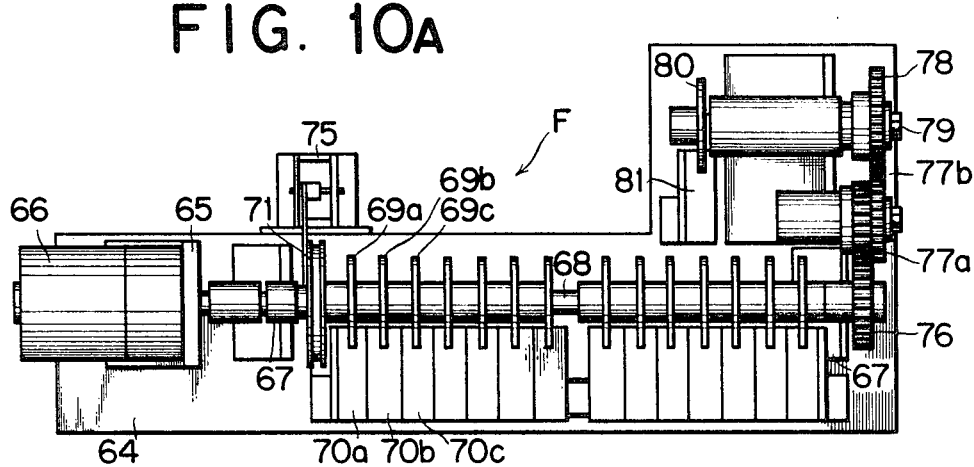
FIG. 10A shows a front view of a switch mechanism.
Figure 10B:
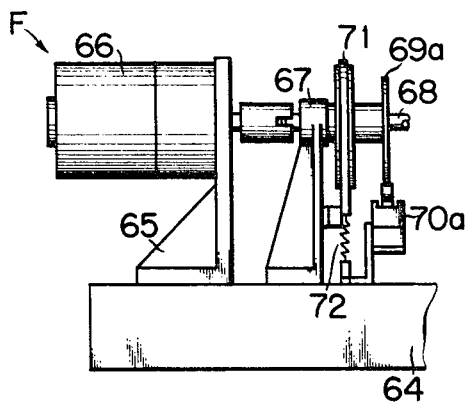
FIG. 10B is a side view of the brake portion of the switch mechanism shown in FIG. 10A.
Figure 10C:
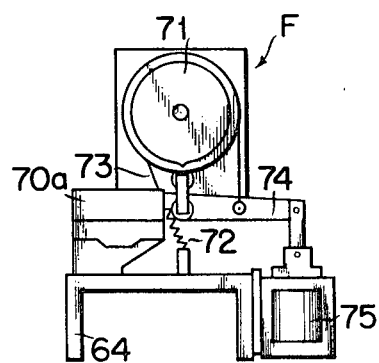
FIG. 10C shows a front elevation of the brake portion shown in FIG. 10B.

FIGS. 10A, 10B and 10C illustrate a switch mechanism F which controls electric connections to various components such as electromagnetic clutch 13 and electromagnetic coupling 10a, electromagnetic brake 33, miniature motors 27 and 60 with reduction gearings and air cylinders 54, 54a and 58. A mounting pedestal 65 is provided at one end of a base 64 to support miniature motor 66 with a reduction gearing. A cam shaft 68 coupled to the motor shaft is journalled by bearing pedestals 67. A plurality of spaced apart cam plates 69a, 69b, 69c . . . are mounted in parallel on cam shaft 68 to respectively actuate switches 70a, 70b, 70c . . . which are respectively included in the circuits of said various component elements. A drum 71 comprising a brake mechanism is mounted on cam shaft 68 close to one of the bearing pedestals 67. A belt 73 is passed around drum 71, one end of the belt 73 being connected to a spring 72 while the other end connected to an intermediate point of a lever 74 pivoted at one end thereof. The other end of lever 74 is connected to a plunger of a solenoid 75 so that upon energization of the solenoid braking force is applied to cam shaft 68. A gear 76 is mounted on the free end of cam shaft 68 to drive a cam plate 80 through gears 77a, 77b, 78 and a shaft 79 thereby actuating a switch 81. As will be described later in more detail, by changing gears 77b and 78 for different gears it is possible to vary the timing of switch 81 to form straight portions of different lengths between adjacent coil section.

The operation of the coil winding machine is as follows:

As shown in FIG. 4, the mandrel 1 is payed out from spool 16 of unwinder 17 and advanced through guide roller 15, hollow shaft 31 of coiling device B and through opening 46a of nozzle 46. Then the mandrel is wound about the periphery of drum 12 of drum device A through chuck device C. Thus, the mandrel is continuously advanced by the rotation of drum 12 and is finally taken up by spool 18 of slip winding device 19. On the other hand, the filament wire 2 payed out from bobbin 43 is conveyed to bridging pin 48 via guide rollers 39 to be helically wound around the mandrel by the rotation of coil head 32. When the coil head 32 is stopped chucks D and E of chuck device C are moved in the same direction as the mandrel whereby jaws 56 and 56a operate to advance filament wire 2 together with mandrel 1 to form straight leg portions 4b between coil sections 4a.

Operations of respective components are as follows: Motor 5 and electromagnetic clutches 10a and 13 are energized to rotate coiling head 32 and drum 12 to helically wind the filament wire 2 about the mandrel 1 to form a coil. Disc 34 is rotated with coiling head 32 or hollow shaft 31 to operate counting mechanism G comprising lamp 35 and phototransistor 36 to count the number of turns of the coil. Several turns before a predetermined number of turns of the coil have been wound a first signal is sent through a relay, not shown, to energize solenoid 75 of the switch mechanism F to disconnect cam shaft 68 from motor 66. When the predetermined number of turns of the coil section have been wound a second signal will be sent by the counting mechanism to disengage electromagnetic clutches 10a and 13 and to apply electromagnetic brake 33 to stop rotation of coiling head 32 and drum 12 thus finishing a winding operation of one coil section. Then, the miniature motor 66 is energized to sequentially operate switches 70a, 70b, 70c . . . by cam plates 69a, 69b, 69c . . . . First, switch 70a is operated to open an electromagnetic valve, not shown, to exhaust air from air cylinder 54 to retract cam plate 54b. As a result, jaws 56 are closed by the restoring force of spring 55 to clamp mandrel 1 and filament wire 2 at the end of a coil. Thereafter switch 70b is closed to energize motor 27 through a relay, not shown. Concurrently therewith, as clutch 23 is disengaged jaws 56 are pulled by drum 12 while they are clamping mandrel 1 and filament wire 2 thus forming a leg portion 4b of coil 4. Then switch 70c is operated to deenergize miniature motor 27. The motor may be rapidly stopped by passing direct current therethrough for a moment to release electromagnetic brake 33, thus permitting rotation of the coiling head 32.

Further, upon closure of switch 70e, an electromagnetic valve, not shown, will be energized to actuate air cylinder 58. Thus, chuck support 51a is moved toward chuck support 51. Thereafter, switch 70f is operated to exhaust air from air cylinder 54a to cause jaws 56a to clamp mandrel wire 1 and filament wire in the same manner as above described. Simultaneously therewith, the counter of the counting mechanism G is reset to zero and switch 70g is actuated to engage electromagnetic clutch 10 thus preparing to rotate drum 12 through one-way clutch 23. Upon closure of switch 70h, the electromagnetic clutch is engaged to rotate coiling head 32 thus resuming the coil winding operation. After filament wire 2 is wound several turns around mandrel 1, switch 70i will be closed to operate air cylinders 54 and 54a to open jaws 56 and 56a respectively through cam plates 54b and 54c. Then switch 70e is released and chuck support 51a of chuck E is restored by spring 59 thus disengaging chuck E from mandrel 1. Thereafter switch 70j is closed to energize a motor 60 through a relay, not shown, to wind rope 62 around drum 61 thus restoring chucks D and E to their original positions. When further switch 70k is operated, the miniature motor 60 is deenergized which may be quickly stopped by passing direct current therethrough. Then switch 70l is operated to reverse the rotation of miniature motor 60 through a relay, not shown, to unwind rope 62 from drum 61. Then the reverse rotation of miniature motor 60 is stopped by switch 70m. Finally, switch 70n is operated to deenergize driving miniature motor 66 of switch mechanism F and to energize solenoid 75 to apply braking force thus stopping the rotation of cam shaft 68. Meanwhile the coiling head 32 operates to wind another coil section and the machine will be brought to the starting point of its cycle of operation when counting mechanism G operates.

Figure 11A:
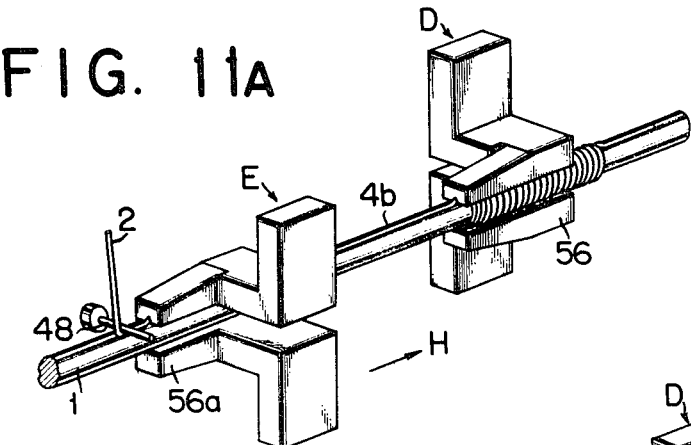
FIGS. 11A, 11B and 11C are perspective views of the chuck mechanism to explain the operation of respective chucks at the time of forming a filament coil.
Figure 11B:
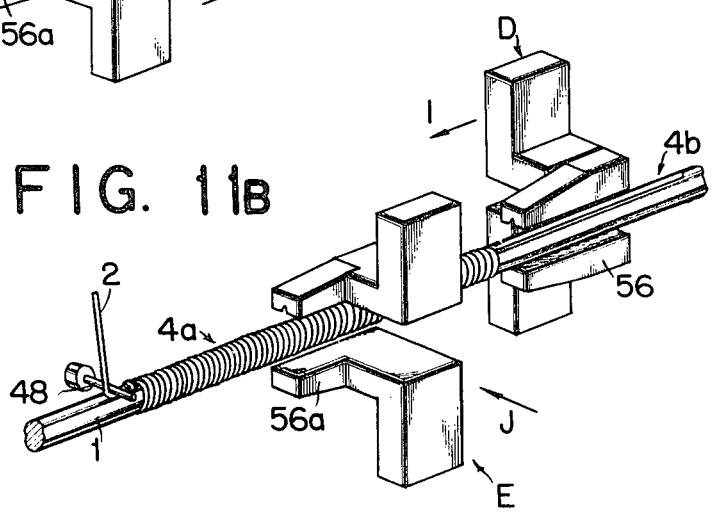
Figure 11C:
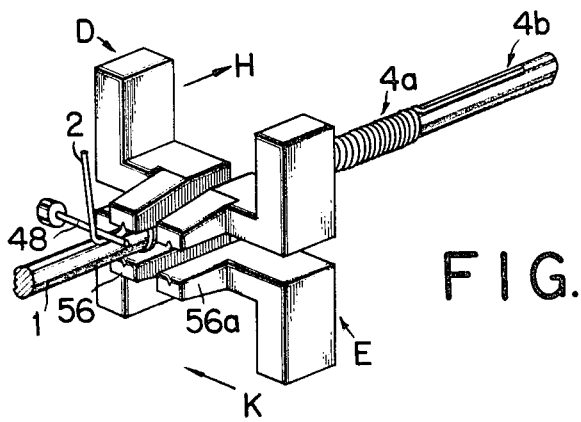

FIGS. 11A, 11B and 11C diagrammatically show various operating steps of chucks D and E and their jaws 56 and 56a. FIG. 11A shows a condition just prior to begin to wind the filament wire 2 about mandrel 1 to form a coil section 4b. More particularly, jaws 56a of chuck E are clamping filament wire 2 and mandrel 1 at a position closest to bridging pin 48 of the coiling head. Jaws 56 of the other chuck D are also clamping a previously wound coil section 4b at a position ahead of chuck E. Under these conditions, upon rotation of the coiling head, the mandrel 1 will be advanced to form next succeeding coil section 4a on the mandrel 1. After forming several turns of the coil section, jaws 56 and 56a of both chucks D and E are operated to release filament wire and mandrel. This condition is shown in FIG. 11B. Then, chuck D is restored toward the coiling head as shown by arrow I. The other chuck E is moved in the direction of arrow J, that is in the direction perpendicular to direction H, prior to chuck D is brought against it, and chuck E is then restored in the direction of arrow I. FIG. 11C shows this condition wherein both chucks D and E are restored toward the coiling head. When a predetermined number of turns of the subsequent coil section 4a have been wound the operation of the coiling head is stopped and jaws 56 of chuck D will be moved to clamp filament wire 2 against mandrel 1 at the last turn of the coil section 4a. The jaws 56 thus closed are pulled in the direction of arrow H by the forward movement of the mandrel. At this time, since the coiling head is not rotating the filament wire will be pulled axially in parallel with the mandrel to form a straight leg portion 4b of the filament coil. After forming the straight leg portion 4b of a definite length, jaws 56a of chuck E are again brought close to the mandrel in the direction of K and are then closed to clamp the filament wire and the mandrel. This condition is the one shown by FIG. 11A and new cycle of operation is commenced. Thus, chucks D and E are constructed and arranged such that chuck D will clamp the final end of each filament coil section while chuck E the end of the leg of each filament coil section. Further, chuck D is reciprocated along the axis of the mandrel while chuck E along a rectangular path, one side thereof being aligned with the direction of movement of the mandrel.

Although in the above described embodiment coils having relatively long straight legs on the opposite sides were formed, the coil winding machine can also be used to form filament coils having relatively short straight legs portions 4c between adjacent coil sections 4a as shown in FIG. 3. Coil sections 4a are formed by coiling head 32 under control of switches 70a and 70b in the same manner as above described. In this case, however, prior to the operation of switch 70c, a switch 81 is closed by a cam plate 80 mounted on a shaft 79 which is driven by a gear 76 mounted on one end of cam shaft 68 through gears 77 and 78. Operation of switch 81 opens the relay circuit associated with switch 70c so that the electromagnetic brake 33 is rendered inoperative, whereby short straight portions 4c are formed by the filament wire.

Then, switch 70d is operated to deenergize miniature motor 27 which is quickly stopped by braking. Then the coiling head 32 is again rotated to form next coil section.

The length of short straight portions 4c or the number of revolutions of shaft 79 which operates switch 81 is adjusted by clamping gear ratio between gears 77b and 78.

What is claimed is:

1. In an apparatus for winding coils on a mandrel wherein a mandrel is fed from the input end of the apparatus longitudinally across a coiling head (B) and pulled by pulling means (12) towards the exit side of the apparatus as the coiling head is rotated about the continuously advancing mandrel to helically wind the wire about the mandrel to form coil sections; the improvement therein to form a straight leg portion between adjacent coil sections as the mandrel is advanced while the rotation of the coiling head is stopped, comprising:

(a) first chuck (D) on one side of said mandrel with jaws (56) normally disposed towards said pulling means (12) and capable of longitudinal movement towards said coiling head (B);

(b) second chuck (E) on the other side of said mandrel with jaws (56a) longitudinally spaced from said first chuck (D) and capable of movement including guide means (57, 59, 53a, 52a) for imparting a rectangular movement to said second chuck (E);

(c) cam means and spring means acting on said first and second chuck jaws to cause said jaws to clamp and unclamp said mandrel and wire (2); and (d) switch means operatively connected to said cam means, said coiling head (B) and said pulling means (12) to selectively actuate them, and, timer and program means operatively connected to said switch means to sequentially enable the switches in accordance with a predetermined sequence of operations so that the wire on the mandrel clamped by said chucks can advance straight forward while the rotation of said coiling head is stopped.

2. An apparatus as claimed in claim 1, where the pulling means (12) are a drum.

3. An apparatus as claimed in claim 2, wherein there are first and second drive sources to separately drive said coiling head (B) and said drum (12).

References Cited

UNITED STATES PATENTS 3,322,164    5/1967    Lindsay _____ 140—71.5

LOWELL A. LARSON, Primary Examiner